UNITED STATES PATENT OFFICE.

ALEXANDER L. DUVAL D'ADRIAN, OF WASHINGTON, PENNSYLVANIA.

COMPOSITION FOR OPAL GLASS.

1,419,032.   Specification of Letters Patent.   Patented June 6, 1922.

No Drawing.   Application filed June 27, 1921. Serial No. 480,863.

*To all whom it may concern:*

Be it known that I, ALEXANDER L. DUVAL D'ADRIAN, a citizen of the Republic of France, residing at Washington, in the county of Washington and State of Pennsylvania, have invented certain new and useful Improvements in Composition for Opal Glass, of which the following is a specification.

My invention relates to a composition to be added to the usual glass mixture for producing opal glass, to the process of producing the composition, and to the glass produced as a final product.

The process consists generally in adding to the usual glass mixture, the double fluorides: of silicon, known as silicofluorides, of boron, known as borofluorides, of tin, known as stannofluorides, of zirconium, known as zirconofluorides, and of titanium, known as titanofluorides; with the flourides of the alkaline earth metals and heavy metals.

I am aware that sodium silicofluoride has been used for this purpose, but I have found that more satisfactory results are obtainable with smaller quantites, by using the complex fluorides of silicon, boron, tin, zirconium, or titanium, with the fluorides of the alkaline earth metals or heavy metals. As examples of these complex fluorides may be mentioned magnesium silicofluorides, zinc borofluorides, lead zirconofluorides, barium stannofluorides or aluminum titanofluorides. These complex fluorides may be used separately or mixed with others.

An example of a glass mixture or composition using these materials is as follows:

Sand_____ 1000 pounds.
Soda ash_____ 350 pounds.
Feldspar_____ 200 to 300 pounds.
Magnesium silicofluoride____ 5 to 50 pounds.
Barium stannofluoride_____ 5 to 50 pounds.

The magesium silicofluoride and barium stannofluoride can be varied in quantity according to the desired results, and may be replaced in whole or in part by the silicofluoride, or stannofluorides, of any of the other alkaline earths or heavy metals, or by the corresponding borofluorides, zirconofluorides or titanofluorides.

A further example of a glass mixture embodying the invention is as follows:

Sand_____ 1000 pounds.
Soda ash_____ 350 pounds.
Feldspar_____ 200 to 300 pounds.
Barium stannofluoride_____ 5 to 50 pounds.
Lead zirconofluoride_____ 5 to 50 pounds.

I have found that satisfactory results are obtained by employing a complex fluoride of an amphoteric element with either an alkaline earth metal or a heavy metal. Also the fluorides above described, may be used with both the alkaline earth metals and the heavy metals.

The glass mixture produced as above described is introduced into the usual furnace and heated and fused.

I regard the complex fluorides of silicon, boron, tin, zirconium, and titanium, with the fluorides of the alkaline earth metals or the heavy metals, as the chemical equivalent of each other, and by claiming any one, I contemplate covering the use of all.

Having thus described my invention, I claim:—

1. A composition to be added to the usual glass mixture, comprising a complex fluoride of an amphoteric element with a fluoride of an akaline earth metal.

2. A composition to be added to the usual glass mixture, comprising a complex fluoride of an amphoteric element with a double fluoride of a metal.

3. A glass composition, comprising substantially 1000 parts by weight of sand, 350 parts by weight of soda, and 5 to 50 parts by weight of a complex fluoride of an amphoteric element with a fluoride of an alkaline earth metal.

In testimony whereof I affix my signature.

ALEXANDER L. DUVAL d'ADRIAN.